United States Patent [19]

Güttinger

[11] Patent Number: 4,758,100
[45] Date of Patent: Jul. 19, 1988

[54] AUTOMATIC LUBRICANT METERING APPARATUS

[75] Inventor: Frank Güttinger, Oberehrendingen, Switzerland

[73] Assignee: Aginfor AG fur industrielle Forschung, Wettingen, Switzerland

[21] Appl. No.: 100,328

[22] Filed: Sep. 23, 1987

[30] Foreign Application Priority Data

Sep. 25, 1986 [CH] Switzerland .................. 03853/86
Mar. 13, 1987 [CH] Switzerland .................. 00947/87

[51] Int. Cl.⁴ .................. F16C 33/10; F16C 33/66; F16N 11/04
[52] U.S. Cl. .................. 384/399; 184/45.1; 384/397; 384/401
[58] Field of Search .................. 384/160, 163, 322, 373, 384/374, 377, 386, 388, 397–401, 462, 471, 473, 606; 184/45.1, 45.2, 37, 39, 41

[56] References Cited

U.S. PATENT DOCUMENTS

| 1,717,288 | 6/1929 | Watres | 354/279 |
| 2,850,336 | 9/1958 | Dochterman | 384/402 |
| 2,857,020 | 10/1958 | Otto | 184/45.1 |
| 2,999,725 | 9/1961 | Schaefer | 384/408 |
| 3,206,261 | 9/1965 | Schaefer | 384/471 |

FOREIGN PATENT DOCUMENTS

| 274749 | 2/1912 | Fed. Rep. of Germany . |
| 323979 | 9/1919 | Fed. Rep. of Germany . |
| 137544 | 3/1930 | Fed. Rep. of Germany . |
| 413021 | 7/1934 | United Kingdom . |

Primary Examiner—John Petrakes
Assistant Examiner—Thomas R. Hannon
Attorney, Agent, or Firm—Burns, Doane, Swecker & Mathis

[57] ABSTRACT

An automatic lubricant metering device consists essentially of a housing (4), from inside of which a piston (5) is conveying a lubricant (15) through a feeder line (12) to the lubricating location (2) of a revolving shaft (1). The automatic feature consists of that the spring-loaded piston (5) is connected with a pin (6) made of an abradable material. The advance of the piston (5) is a function of the abrasion of the pin (6) on the appropriately roughened surface of the shaft. The lubricant is contained in a compressible bellows (11) equipped with a feeder line (12) to the lubricating location (2). The feed to the lubricating location is conducted in the area of the shaft through a pipe (13) located preferably without contact in a center bore (14) of the shaft. The outlet of this pipe opens into a radial bore (16) connected with the lubricating location (16).

8 Claims, 2 Drawing Sheets

AUTOMATIC LUBRICANT METERING APPARATUS

BACKGROUND OF THE INVENTION

1. Field of the Invention

The invention generally relates to the lubrication of shafts and particularly concerns an automatic lubricant metering apparatus for the lubrication of a rotating shaft, with a piston/cylinder system.

2. Description of the Prior Art

An apparatus of this general type is known from U.S. Pat. No. 3,206,261. This reference concerns an apparatus, the object of which is not the metering itself, the latter being defined as a continuous supply of matter. Rather, in the reference a spring-loaded bellows acts on the lubricant bellows only when the abradable material in the form of a pin has been completely abraded. In the process, a larger volume of the lubricating grease is injected in the roller bearing in a single thrust. The apparatus is annular in layout and is placed in the immediate vicinity of the bearing within the housing. This installation within the machine effectively removes the conveying apparatus from access for regular inspection relative to the operating mode and lubricant level. In addition, this configuration renders any refitting of existing machines with the apparatus impossible. The apparatus is particularly unsuitable in installations wherein new lubricant material must be supplied continuously to the bearing locations.

OBJECTS AND SUMMARY OF THE PRESENT INVENTION

It is therefore an object of the present invention to provide a simple, readily maintained lubricant supply apparatus that is continuously effective in operation.

This object is attained according to the invention in that:

the housing of the apparatus is placed in a stationary part of the machine surrounding the shaft to be lubricated, preferably in the vicinity of a free shaft end, the bellows is equipped with a feeder line to the lubricating location, and the feeder line to the lubricating location is represented by a pipe located in a center bore of the shaft preferably without contact with the bore, with the outlet of said pipe opening into a radial bore connected with the lubricating location.

It is particularly advantageous that a lubricant metering apparatus of this type may be placed on the machine part in any angular position desired. Furthermore, all tubular screw connections and seals of the feed line on the side of the shaft become unnecessary.

In particular, if in the plane relative to the radial bore the shaft bore is provided with a circumferential collector groove for the lubricant, this yields the advantage that even if the shaft is stationary, the dripping of the lubricant, due for example to temperature, from the feed pipe, will not result in a flow of the lubricant from the central shaft bore.

As the apparatus is intended to supply the lubricant continuously during the rotation of the shaft, a particularly simple means is available, if the pressuring means consists of a compression spring having a very flat characteristic and located above the piston, whereby the volume of the lubricant to be supplied per unit time may be determined with otherwise constant parameters, merely by the proper selection of the spring.

In view of the fact that the lubricant supply is located in a closed, compressible bellows, the system has no sealing problems. An empty bellows may be replaced without difficulty by a filled one.

If several bearing locations are to be supplied with lubricants, it is advisable to divide the bellows into several separate chambers, with the chambers extending over the entire height of the cylinder. The chambers may be located adjacently to each other over the circumference, or they may be in the form of annular chambers concentrically nested into each other.

It is advantageous to provide as the abradable material a pin for example of graphite, which passes through the stationary part of the machine through a bore and is pressured against the surface of the shaft. The functional unit of the piston and the pin created in this manner, may be provided in the form of a replaceable, commercially available unit.

If the location furthering the abrasion of the shaft is diagonally or axially and radially knurled and is extending preferably over the entire circumference of the shaft, this intentional roughness may be used as a constant value in the coordination of the abradable pin and the compression spring.

If the space surrounding the shaft is under pressure, it is advantageous to connect this space relative to pressure with the inner space of the metering apparatus. In this manner, the force of the spring alone determines the advance of the abradable material.

BRIEF DESCRIPTION OF THE DRAWINGS

The preferred embodiment of the invention is discussed in the following detailed description which should be considered in connection with the figures in the accompanying drawing in which.

In the different figures, corresponding parts are provided with identical reference symbols.

DETAILED DESCRIPTION OF A PREFERRED EMBODIMENT

Figure 1:
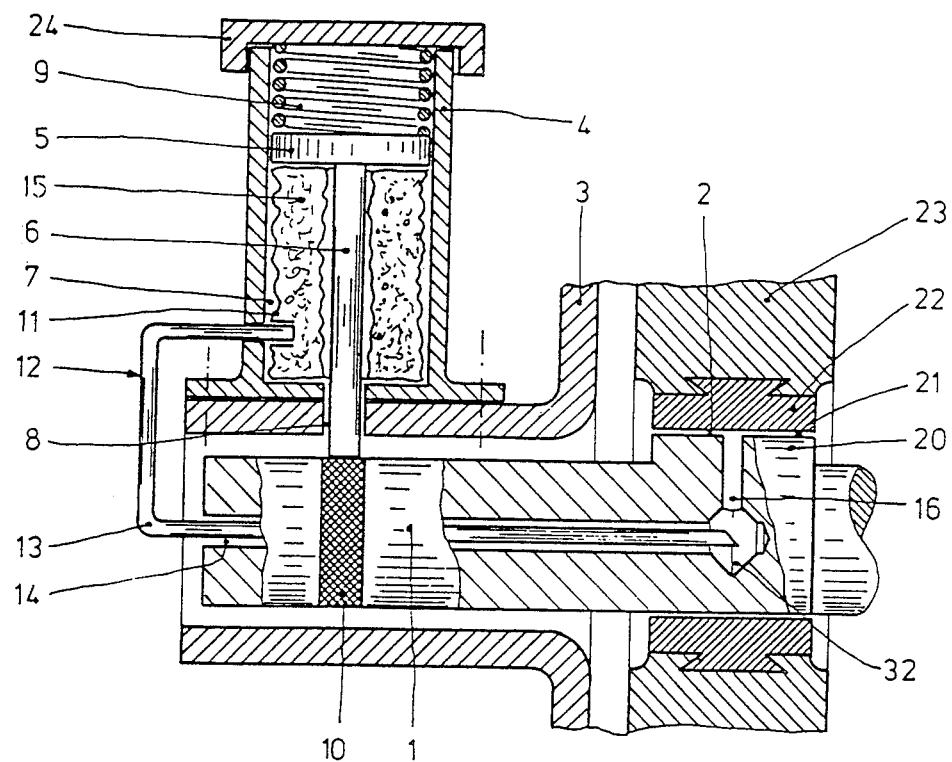
FIG. 1 is a schematic view of a first embodiment with reference to a single bearing location to be lubricated.

In FIG. 1, parts that are not essential for the invention, such as for example the configuration and mode of operation of the machine belonging to the bearing, are eliminated. It is sufficient for the comprehension of the invention to know that the shaft 1 is a camshaft and that the cam 20 is guided in a slide bearing. The machine part provided with the bearing metal 22 may be a disk following the cam motion. The annular gap 21 between the cam and the bearing metal thus constitutes the lubricating location 2 proper. The operation is based on grease lubrication. Any lateral bearing seals that may be required are not shown.

The free, collared shaft end is surrounded by a stationary machine part, for example the outer housing of the machine. At the outermost end of this machine part 3 the housing 4 of the metering apparatus is secured by means of a screw joint indicated in the flange of housing 4 by a broken line. The basic shape of the housing may be arbitrary. In the housing, which in this case is cylindrical and is closed with a screwed-on cover 24, a piston 5 is located. A cylindrical pin 6 is connected with said piston and consists, according to the invention, of a wearing, i.e. abradable material. Depending on the rate of advance desired, the material may be graphite, a graphite containing substance or any other suitable material. The length of the piston 5 is such that in its uppermost position in the cylinder it penetrates the bottom of the latter and is pressured through a bore 8 in the stationary machine part 3 against the shaft 1.

The counter surface of the shaft is mechanically roughened in the form of axial and radial knurling 10. The knurling extends over the entire circumference of the shaft and is designed so that the abradable material of the pin 6 does not settle in the valleys cut into the surface of the shaft.

The pressure means 9 required for the abrasion in the present case consist of a metal compression spring with a very flat characteristic. It is located in the housing 4 between the top side of the piston and the cover 24. Obviously, any other pressure means capable of urging the piston 5 with an approximately constant force through the cylinder 7, may be suitable.

It should be noted here that the pressure means 9 is required not only to overcome the contact force of the pin 6, but in particular must carry out the function of a lubricant conveyor. The lubricant, grease in this case, is located in the cylinder 7 under the piston. It is contained in a closed bellow 11, which is placed around the pin 6 in a manner such that it fills the cylinder. The configuration of the bellows makes possible its compression by the piston 5 under pressure.

In the process, the piston empties its contents into the feed line 12 to the lubricating location 2. This feed line consists in the simplest case of a bent pipe 13. One of the pipe ends is inserted through an opening of the housing into the bellows 11, or a mouth piece of the bellows may be drawn over the end of the pipe. The other end of the pipe penetrates without contact deep into the shaft 1. For this purpose, the shaft 1 is provided with an appropriately dimensioned center bore 14, which extends from the end of the shaft to the plane of the lubricating location 2. In this plane the end of the pipe is bevelled off, so that it discharges the lubricant directly into a radial bore 16, which in turn opens directly into the lubricating gap.

This configuration assures without any particular sealing measures that no lubricant runs or flows out at the end of the shaft. This is true for a stationary state of the machine, in which the piston 5 is resting by means of the pin 6 on the shaft 1 only and thus applies no pressure to the bellows 11. It is also true for the case of a rotating shaft, in which as the result of the advance of the piston caused by the abrasion of the pin and the pressure of the spring, the lubricant is conveyed initially through the pipe 13 and is then thrown by the centrifugal force from the bevelled opening into the radial bore 16. The increase in pressure in the lubricant due to the centrifugal force makes possible its satisfactory distribution in the annular gap and the performance of the lubricating function itself.

Should it occur occasionally that with the machine at rest a few drops of the lubricant flow out of the bevelled opening of the pipe, which may take place for example due to temperature effects, these quantities, which are slight in any case, are collected in the circumferential collector groove 32. In the course of the next revolution of the shaft, this lubricant is to be moved by the centrifugal force into the radial bore. For this, the deepest point of the V-shaped collector groove is placed in the plane of said radial bore, in which the opening of the feeder pipe is also located.

Figure 2:
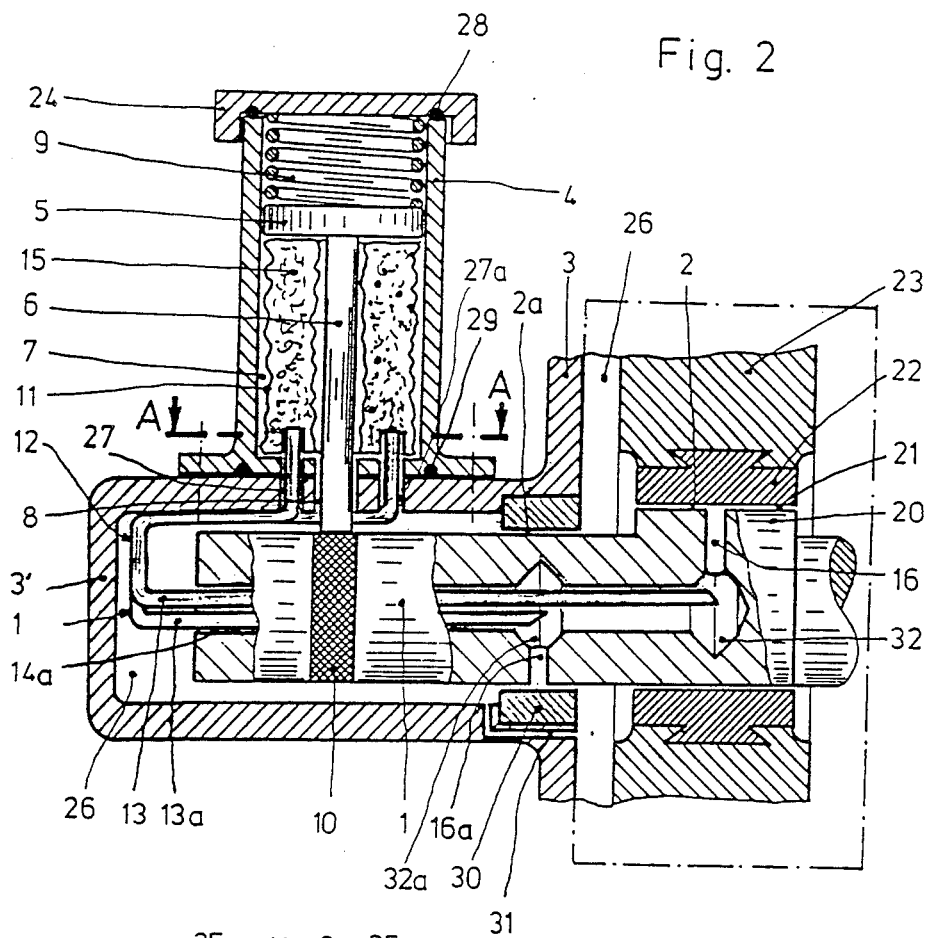
FIG. 2 is a schematic view of a second embodiment with two pressurized bearing locations.

FIG. 2 shows the lubricant metering apparatus in an installation, the internal space of which—as indicated by broken lines—is closed to the outside. It may consist of a compressor, whereby it is implied that the space 26 between the moving parts 1, 2 and the stationary machine part 3 is under pressure. In order to eliminate expensive and vulnerable shaft seals and to prevent the loss of working media, the stationary part 3, i.e. the machine housing, is equipped with a closure 3' on the frontal side. To assure satisfactory lubrication under all possible pressure conditions, the cylinder 7 and thus the bellows 11 are exposed to the same pressure as that prevailing in the space 26 and thus in the shaft bore 14a. In contrast to the example according to FIG. 1, the feeder line 12 is passed out of the metering apparatus through the bottom of the housing 4 and is conducted through an appropriately located passage hole 27 in the machine part 4, into the area of the shaft. The passage hole 27 and the bottom opening are dimensioned so that the feeder line 12 passes through them without sealing. Consequently, there exists an equality of pressure in the internal space 26 of the machine and the cylinder space 7. The question whether this pressure equalization would take place in any case through the bore 8 housing the pin 7 is being left undecided. It is understood that the cover 24 is sealed against the housing 4 and the bottom of the housing against the machine part 3. In the present case, this is indicated by the simple application of round gaskets 28 and 29.

If the feeder line would be installed as in FIG. 1, it would be necessary to seal off additionally its lateral outlet from the housing 4 and the frontal introduction into the closure 3'.

A further advantage of the passage through the bottom becomes apparent if several lubricating locations are to be served. In the present example the shaft 1 is additionally supported by a radial journal bearing 30.

A pressure equalizing bore 31 connects the enclosed internal space around the end of the shaft with the space around the moving machine part 23. The lubricating gap 2a of the bearing journal is supplied through a radial bore 16a in the shaft 1. The shaft bore is provided in the plane of the radial bore 16a with a collector groove 32a. As independent lubrication is intended, the radial bore 16a is supplied through the bore 13a by a separate feeder line 12a. The center shaft bore 14a is correspondingly dimensioned larger to receive the two pipes 13 and 13a. Similarly to the line 12, the feeder line 12a is again connected with the bellows 11 through the passage holes 27a in the machine art 3 and the bottom of the housing with the bellows 11.

If a single bellows is used, the volume supplied through the lines 12 and 12a is determined—aside from the fact that the lubricating gap itself may control the consumption of the lubricant—by their cross sections.

Figures 3, 4:
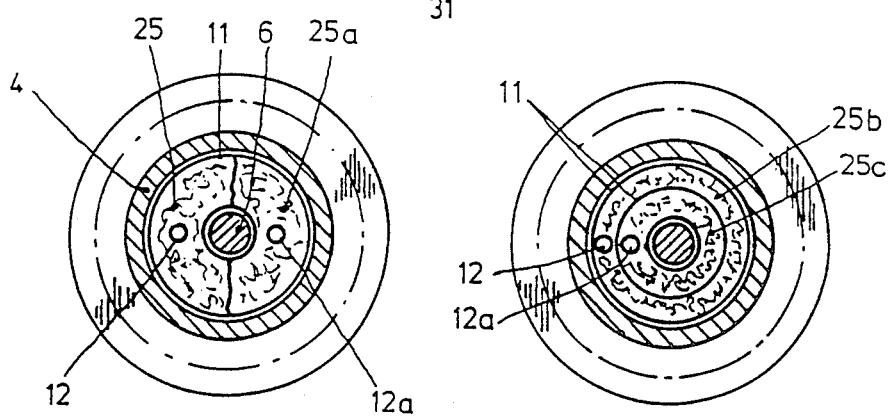
FIG. 3 is a cross sectional view taken along the line A—A of FIG. 2.
FIG. 4 is a cross sectional view according to FIG. 3 with a variant of the bellows layout.

However, as shown in FIG. 3, a simpler control means is available here, wherein for example each feeder line is connected with its own segment of the bellows. The vertically divided chambers 25, 25a, in a deviation from the form shown, may also have different cross sections. During the stroke of the piston then lubricant volumes corresponding to these cross section are moved in the feeder lines. It is obvious that in this manner several cake-shaped chambers may also be provided adjacent to each other.

FIG. 4 shows a layout for which the feeder line described in FIG. 2 is particularly suitable. The separate chambers 25b, 25c are here nested into each other and are forming annular cylindrical chambers. It is readily seen that here again merely by the provision of appropriate annular cross section, different volumes may be conveyed per unit stroke. A lateral passage of the feeder lines would here be too cumbersome for the inner chamber 25c.

A further advantage of the layouts shown in FIGS. 3 and 4 may be seen in that it is possible to transport different types of lubricants in keeping with the requirements of the individual lubricating locations, while using a single metering device.

The invention is obviously not restricted to the examples of embodiment shown and described. In addition to the numerous possible installations and modes of attachment of the metering device, the selection of the pressure means, the abradable material, the degree of roughness at the point of attack and of the lubricant itself, are subject to practically no restriction.

Naturally, additional accessories, such as for example an external display of the prevailing position of the piston, a wear indicator, and the like, may render the operation of the apparatus even more simple.

Therefore, while the invention has been illustrated and described in accordance with a preferred embodiment, it is recognized that variations and changes may be made and equivalents employed herein without departing from the invention as set forth in the claims.

What is claimed is:

1. An automatic lubricant metering apparatus for use in the lubrication of a rotating shaft, comprising:
   a shaft having a location to be lubricated;
   a stationary machine part surrounding said shaft;
   a housing mounted on said stationary machine part and defining a cylindrical space having a first end adjacent said machine part and a second end remote from said machine part;
   a piston disposed for sliding movement in said cylindrical space, at least a part of said piston being formed of an abradable material;
   biasing means interposed between said piston and said second end of said cylindrical space for biasing said piston toward said first end of said cylindrical space, said housing and said machine part having openings adjacent said first end of said cylindrical space, a part of said piston formed of said abradable material extending through said openings and being in contact with said shaft, said shaft being further provided with means for causing abrasion of said part of said piston made of abradable material at the place of contact between said shaft and said part of said piston;
   a closed compressible bellows disposed in said cylindrical space between said piston and said first end of said cylinder;
   a lubricant supply provided within said bellows;
   a feeder line means connected between said lubricant supply and said location to be lubricated to deliver lubricant from said supply to said location to be lubricated.

2. The lubricant metering apparatus according to claim 1, wherein said bellows is divided into at least two chambers each having separate contents, said chambers being extendable over substantially the entire height of the cylinder.

3. The lubricant metering apparatus according to claim 2, wherein said chambers are located concentrically with respect to each other in the cylinder.

4. The lubricant metering apparatus according to claim 1, wherein said piston includes a piston body and a pin, said pin forming said at least part of said piston formed of abradable material and being attached to said piston body at a side of the body closest to said first end of said cylindrical space.

5. The lubricant metering device according to claim 1, wherein said means for causing abrasion includes a circumferential surface of said shaft which is knurled.

6. The lubricant metering device according to claim 1, wherein a space located between said shaft and said machine part is under pressure, said space communicating with said cylindrical space through a passage hole for said feeder line means.

7. An automatic lubricant metering apparatus for use in the lubrication of a rotating shaft, comprising:
   a shaft including a location to be lubricated, a radial bore connected with said location to be lubricated, and a central bore opening into said radial bore;
   a stationary machine part surrounding said shaft;
   a housing located on said stationary machine part and defining a cylindrical space having a first end adjacent said shaft and a second end remote from said shaft;
   a piston disposed for sliding movement in said cylindrical space, at least a part of said piston being formed of an abradable material;
   biasing means interposed between said piston and said second end of said cylindrical space for biasing said piston toward said first end of said cylindrical space, said housing and said machine part having openings adjacent said first end of said cylindrical space, a part of said piston formed of said abradable material extending through said openings and being in contact with said shaft, said shaft being further provided with means for causing abrasion of said part of said piston made of abradable material at the place of contact between said shaft and said part of said piston;
   a closed compressible bellows disposed in said cylindrical space between said piston and said first end of said cylindrical space;
   a lubricant supply provided within said bellows;
   a feeder line connected between said lubricant supply and said radial bore, said feeder line including a pipe extending through said central bore and opening into said radial bore.

8. The lubricant metering device according to claim 7, wherein in the plane of the opening of said pipe and said radial bore, said central bore is provided with a circumferential collector groove for the lubricant.

* * * * *